UNITED STATES PATENT OFFICE 2,356,824

ORGANIC DYESTUFFS OF THE THIONAPH-THENONE SERIES, AND PROCESS OF MAKING THE SAME

John Elton Cole and Benjamin Franklin Skiles, Wilmington, Del., assignors to E. I. du Pont de Nemours & Company, Wilmington, Del., a corporation of Delaware No Drawing. Application May 1, 1941, Serial No. 391,308

8 Claims. (Cl. 260—330)

This application is a continuation-in-part of our copending application Serial No. 295,918, filed September 30, 1940.

This invention relates to novel organic dyestuffs and to processes for making the same. More particularly, this invention deals with novel organic compounds of the group which are obtainable by condensing a thioindoxyl compound with a benzenoid compound having a reactive oxygen atom, for instance a benzene aldehyde or a nitroso-benzene compound, the characteristic of the novel series being that the dyestuff contains at least one hydroxy alkyl radical, or an ester thereof, attached to at least one of the aryl nuclei of the principal components, that is the thioindoxyl or the benzenoid compound, by the agency of an oxygen, sulfur or nitrogen atom.

The present application is concerned particularly with the esters of the aforegoing compounds.

Our novel compounds of this invention may be expressed by the general formula

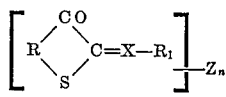

wherein R is an ortho-arylene radical of the benzene or naphthalene series, $R_1$ is an aryl radical of the benzene series, X stands for N or CH, $n$ is an integer, usually 1 or 2, while Z stands for an aliphatic side chain which contains at least one alkyl radical in turn containing at least one OH group or an ester thereof and being attached to one of the aromatic radicals R and $R_1$ by the agency of a non-carbonic atom, for instance oxygen, sulfur or nitrogen.

The nature of this substituent Z will be better understood by considering the following typical members thereof representing several variations permissible in the symbol Z within the scope of this invention. Thus, Z may represent a hydroxy-alkoxy radical, for instance

—OC$_2$H$_4$OH,    —OC$_2$H$_4$OC$_2$H$_4$OH,

—O—CH$_2$—CH—OH,    —OCH$_2$—CH—CH$_2$OH
　　　　|　　　　　　　　　　　　|
　　　　CH$_3$　　　　　　　　　　OH a hydroxy-alkyl-thio radical, for instance

—S—C$_2$H$_4$OH a hydroxy-alkylamino-radical, for instance

—NH—C$_2$H$_4$OH,   —NH—CH$_2$—CH—CH$_2$OH,   —N(C$_2$H$_4$OH)$^2$
　　　　　　　　　　　　　　　　　|
　　　　　　　　　　　　　　　　　OH an ester of any of these, for instance

—OC$_2$H$_4$—OSO$_3$NH$_4$

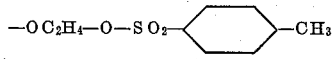

or in general —OC$_2$H$_4$—OY, wherein Y is the radical of an acid capable of esterifying alcoholic OH groups or the OH group of a leuco-vat dye.

The scope of the symbol =X—$R_1$ is best understood by remembering that it is derived by the removal of oxygen from a benzaldehyde or a nitroso-benzene compound. The benzene nucleus may carry further substituents such as alkyl, alkoxy, hydroxy, amino, mono- and dialkyl-amino, mercapto. Where the substituent contains a free hydrogen atom, it may be converted on the finished dyestuff into the form Z as above defined by treatment with ethylene chlorohydrin or other compound capable of replacing the free hydrogen by a hydroxy-alkyl radical. The dyestuff may thus be given an extra Z-substituent in addition to whatever number of these it may have derived from the intermediates employed.

The group

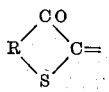

is the radical of a thioindoxyl compound, such as 3-hydroxy-thionaphthene, naphthothioindoxyl or nuclear substitution derivatives of these, such as alkyl, alkoxy, halogen, hydroxy, or the substituent Z as above defined.

Compounds having the fundamental nuclear structures

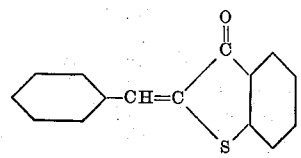

and

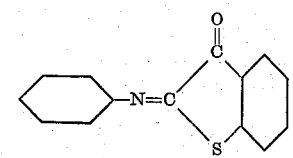

may for simplicity be designated as aralkylidene-thio-naphthenones and arylimino-thionaphthenones, respectively. Accordingly, our invention may be defined as dealing with novel compounds selected from the group consisting of aralkylidene-thio-naphthenones and a r y l i m i n o-thionaphthenones, characterized by possessing in at least one of their homocyclic nuclei at least one hydroxy-alkyl substituent which is attached to said homocyclic nucleus by a non-carbonic atom of the group consisting of oxygen, sulfur and nitrogen, and wherein the hydroxy group is free or is esterified by the radical of an inorganic or organic, mono or polybasic acid.

Inasmuch as the present application deals particularly with the esterified form of the above compounds, the invention herein may be expressed also by the general formula

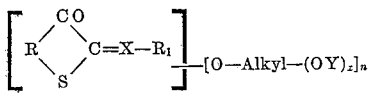

wherein R is an ortho arylene radical having not more than 10 carbon atoms in its cyclic structure, $R_1$ is an aryl radical having 6 carbon atoms in its cyclic structure, X stands for nitrogen or the methine radical (CH), alkyl stands for a lower alkyl radical, $x$ and $n$ each represent an integer not greater than 2, while Y is the radical of an inorganic or organic acid which may be monobasic, for instance p-toluene-sulfonic, or polybasic, for instance sulfuric, phosphoric or boric. In the latter event, the residual acid valency may be free or may be neutralized with inorganic cations such as sodium, potassium or ammonium, or it may be combined with an organic nitrogenous base for instance the primary, secondary or tertiary amines, including in the latter term pyridine, ditolyl-guanidine, and similar nitrogenous bases.

The synthesis of the novel compounds has been described in detail in our parent application. For the purpose of producing the novel esters of the instant application, the compounds of our parent application, in other words the compounds of the above general formula wherein the Z-member carries free OH groups, are subjected to esterification by the aid of any inorganic or organic acid, acid chloride or anhydride of the group commonly used to esterify alcohols or leuco-vat dyes.

Particularly valuable for this purpose are polybasic acids, such as sulfuric, phosphoric or maleic, and if these are employed in quantity corresponding at least to one mole of the acid per alcoholic OH group in the dyestuff, and preferably in excess of said quantity, the resulting dyestuff ester will possess free acidic OH groups.

In this form the resulting esters constitute water-soluble acidic dyestuffs, and may be used as direct dyes for fibers which are normally dyed with acid dyes, for instance silk and wool.

The free acidic OH functions in the latter group of dyestuff compounds may be neutralized by means of inorganic bases such as ammonia, sodium hydroxide, sodium carbonate, potassium hydroxide, etc. to give neutral, water-soluble salts, which may be used as direct dyes for cotton, acetate silk, viscose rayon, nylon and similar fibers, giving in each case the same shade as the original, non-esterified dyestuff. These effects are very remarkable and are in contrast with the common expedient of solubilizing a dyestuff by sulfonation, for in the latter case the color generally loses its affinity for acetyl silk, and undergoes a change in shade.

If desired, the novel half-esters above mentioned may be neutralized with organic bases, for instance by reacting the acid half-ester with nitrogenous bases or by reacting the alkyl-metal or ammonium salts of the half-ester with salts of such bases to give alcohol-soluble or oil-soluble colors. Particularly valuable for this purpose are nitrogenous organic bases of high molecular weight, such as di-o-tolyl-guanidine, di-o-anisyl-guanidine, triphenyl-guanidine, dimethyl aniline, dodecyl aniline, etc. The resulting colors are valuable dyes for paper, wood and leather, and find extensive use in coloring lacquers, resinous products, and petroleum products such as gasoline.

In all cases we have found the novel dyestuffs to possess good light fastness and to be much less phototropic (that is, changing shade under the influence of sunlight) than dyestuffs of similar molecular structure but not possessing the side chain Z as above defined.

Without limiting our invention to any particular procedure, the following examples are given to illustrate our preferred mode of operation. Parts mentioned are by weight.

*Example 1*

The product having the formula

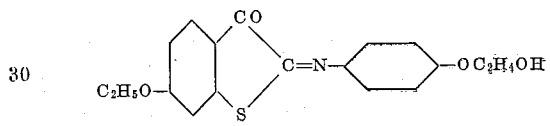

was prepared as follows:

85 parts of 6-ethoxy-3-oxy-thionaphthene were dissolved in 425 parts of ethyl alcohol, 25 parts 30% caustic soda solution and 425 parts water. The resulting solution was stirred into 400 parts water at 40° C., and 80 parts of a paste containing 75% p-nitrosophenol were added. After stirring for 2 hours longer, the product was filtered off and washed with 20% salt solution until the filtrate was colorless. The product was dissolved in 1500 parts of water, and 10 parts of ethylene chlorhydrin were added. The mixture was heated at 80° C. for 20 minutes, when 16.7 parts of 30% caustic soda solution and 10 parts of ethylene chlorhydrin were added. After heating at 80° C. for 30 minutes, another similar addition of caustic soda and ethylene chlorhydrin was made. The mixture was then cooled and the product filtered off, washed with water and dried.

The product has a melting range of 150 to 155° C. and dyes acetate silk and nylon in yellow shades. By treating the above color with concentrated sulfuric acid, the sulfate ester is formed. The sodium salt of this product is water soluble and dyes acetate silk in lemon-yellow shades.

*Example 2*

20 parts of the product obtained in the first paragraph of Example 1 above, were added at 15° C. to 180 parts of sulfuric acid (100%), and the resulting solution was drowned on ice. The sulfate ester thus formed was separated by filtration and dissolved in dilute sodium hydroxide solution, and an aqueous solution of 19 parts of di-o-tolyl-guanidine-hydrochloride was added. The resulting yellow colored product was filtered off, washed and dried. This product dissolved in alcohol, and paper, wood and leather were dyed yellow shades by this solution. It also gave a yellow coloration to lacquer solutions.

Example 3

The product having the probable formula

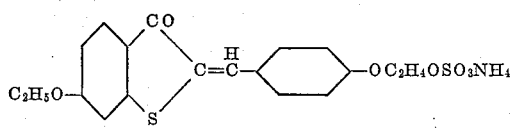

was prepared as follows:

49 parts 6-ethoxy-3-oxy-thionaphthene and 31 parts p-hydroxy-benzaldehyde in 800 parts alcohol and 200 parts concentrated hydrochloric acid were heated at reflux temperature for 1½ hours. The mixture was then drowned in 3000 parts water and made alkaline by adding caustic soda solution. The resulting solution was filtered and the product precipitated by acidification with hydrochloric acid, filtered off and washed acid-free. This product was then dissolved in 500 parts of water and 33 parts 30% caustic soda solution and heated at 80° C. for 2 hours with 20 parts ethylene chlorhydrin and 33 parts 30% caustic soda solution. After cooling, the separated product was filtered off, washed and dried.

10 parts of this product were dissolved in 100 parts of concentrated sulfuric acid at 0° C. and drowned by pouring onto ice. The separated sulfate ester was filtered off, washed and converted to the ammonium salt by dissolving it in water and an excess of ammonium hydroxide and evaporating the resulting solution to dryness in vacuum at 60° C. The resulting dyestuff is a direct, union dye for acetate silk, silk, cotton, wool, nylon and rayon. It dyes these fibers a bright yellow of good light fastness. Due to the fact that it is a water-soluble color, the dye bath is a homogeneous solution and the dyeings are unusually level.

The above dyestuff can also be converted to dyestuffs which are soluble in organic solvents and insoluble in water by precipitating it from a water solution as a water-insoluble salt of an organic base as shown for instance in the next example.

Example 4

10 parts of the ammonium salt of the dyestuff-ester prepared in Example 3 were dissolved in 200 parts of water and an equivalent amount of di-o-tolyl-guanidine-hydrochloride in aqueous solution was added. The di-o-tolyl-guanidine salt of the dyestuff precipitated as yellow solid which was filtered off, washed free of salt, and dried. The product dissolves in alcohol to give a yellow solution which dyes paper, leather and wood bright yellow shades that are fast to light.

If the hydrochlorides, sulfates or other mineral acid salts of triphenyl guanidine, di-o-anisyl guanidine, dimethyl aniline, or dodecyl amine are substituted for di-o-tolyl-guanidine hydrochloride in the above procedure, the corresponding salts are precipitated. The degree of solubility in organic solvents can be varied by varying the organic base used to form the salt. If, for instance, it is desired to prepare a color for use as an alcohol-soluble dye for paper, wood or leather or as a dye for a lacquer containing alcohols as solvents, the salts of di-o-tolyl guanidine or di-o-anisyl-guanidine will give the proper solubility. When it is desired to prepare gasoline-soluble dyes, organic bases containing alkyl groups of ten or more carbon atoms such as dodecyl-amine give the required solubility.

Example 5

Preparation of a di-sulfate ester of the formula

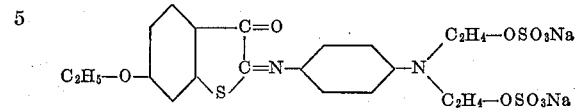

10 parts of the dyestuff prepared according to Example 4 of our parent application (and synthesized from 6-ethoxy-3-oxy-thionaphthene and p-nitroso-N,N-diethanol-aniline) are dissolved in 100 parts of concentrated sulfuric acid at 0° C. The sulfuric acid ester is precipitated when the reaction mass is drowned on ice. It is a red solid which dyes silk, nylon, and wool scarlet shades.

The product may be converted to the sodium salt by dissolving it in water containing enough sodium carbonate to neutralize the acid groups and evaporating the solution to dryness. It is a red, water-soluble union dye which dyes acetate silk, silk, rayon, cotton and wool bright scarlet shades.

When dissolved in water and treated with an equivalent amount of a solution of the hydrochloride of dodecyl amine, a red dodecyl amine salt is precipitated, which is soluble in gasoline, dyeing the gasoline a bright red.

Example 6

Preparation of di-phosphate ester:

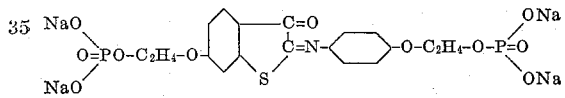

15 parts of the dyestuff prepared in Example 6 of our parent case (by reacting with ethylene-chlorhydrin upon the condensation product of 6-ethanoloxy-3-oxy-thionaphthene and p-nitroso-phenol) are suspended in pyridine and treated cold with two equivalents of phosphorus oxychloride (POCl₃). The intermediate, chlorine-containing product formed is hydrolyzed by warming it with sodium bicarbonate, and the sodium salt of the phosphoric acid ester is isolated by diluting it with water and salting out the product. It is a yellow solid which is soluble in water and dyes acetate silk, wool, silk, cotton and rayon bright yellow shades.

Similar products are obtained by using any of the usual phosphating agents such as phosphorus oxybromide, phosphorus thiochloride (PSCl₃), phosphoric acid, phosphoric anhydride, and phosphorus thiobrimide (PSBr₃).

Dyes, soluble in organic solvents, are obtained by treating the sodium salts of these dyes with solutions of the hydrochlorides of organic bases. They are yellow dyes which may be used to dye leather, wood and paper or to color lacquer solutions and gasoline.

Example 7

Phosphorous ester of formula

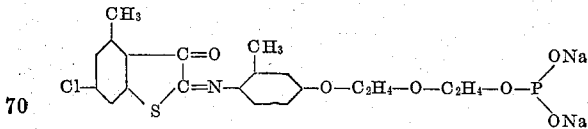

15 parts of the dyestuff obtained as in Example 2 of our parent application (by reacting with ethylene-chlorhydrin upon the condensation product of 4-methyl-6-chlor-3-oxy-thionaphthene with 2-nitroso-5-hydroxy-toluene) are added to 50 parts of phosphorus trichloride (PCl₃) and stirred at 60° C. until no more HCl is evolved. The reaction mixture is cooled, drowned in ice water and the phosphorous acid ester is filtered off. It is converted to the sodium salt by dissolving it in a sodium carbonate solution and salting out the product. The sodium salt is easily soluble in water and dyes acetate silk, natural silk, wool, nylon and cotton yellow shades of good light fastness.

*Example 8*

Sulfate ester of formula

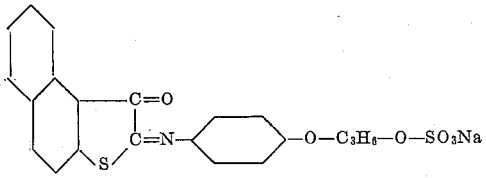

The initial dyestuff was prepared according to the procedure of Example 1 of our parent application above referred to, by condensing 4,5-pheno-3-oxy-thionaphthene and p-nitroso-phenol in an alkaline solution, and then alkylating the product with trimethylene chlorohydrine.

10 parts of the above dyestuff were suspended in 100 parts of pyridine, and 20 parts of pyridine-SO₃, prepared by bubbling sulfur trioxide gas through pyridine until saturated, were added. The mass was heated on a steam bath for one hour. The product was isolated by diluting the mass with water containing an excess of soda ash and removing the pyridine by steam distilling under reduced pressure. The product dyes acetate silk, wool, silk, nylon and cotton yellow shades of good fastness to light.

*Example 9*

Maleic-acid ester of formula

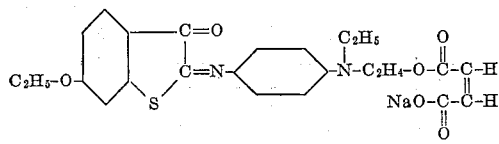

The initial dyestuff was prepared according to Example 4 of our parent application, by condensing 6-ethoxy-3-oxy-thionaphthene with N,N-ethyl, hydroxyethyl-p-nitroso-aniline in an alkaline solution. 5 parts of this dyestuff were then dissolved in 100 parts of dry tetrachloroethane and 1.5 parts of maleic anhydride were added. The charge was refluxed for 5 hours, then cooled to 20° C., and extracted with a dilute solution of sodium carbonate. The sodium salt of the maleic acid half ester was obtained as a red solid. It dissolved in the dye bath to give a clear red solution which dyed acetate silk a bright scarlet shade.

Maleic acid half esters of the other hydroxy-alkylated dyestuffs disclosed in the above examples can be prepared by the same procedure. Half esters of other dicarboxylic acids can be prepared by substituting the anhydride of the appropriate dicarboxylic acid (e. g. succinic anhydride) for maleic anhydride. Other inert solvents such as toluene or pyridine may be used in place of tetrachloroethane.

The solubility of the products can be varied by varying the organic or inorganic base that is used in preparing their salts.

*Example 10*

6-(dihydroxy-propyloxy)-3-oxy-thionaphthene and N,N-dimethyl-p-nitroso-aniline were condensed according to Example 7 of our parent application to give a dyestuff of formula

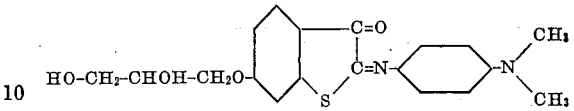

10 parts of the above dyestuff were then dissolved in 100 parts of concentrated sulfuric acid at 0° C. On drowning on ice, the sulfuric acid ester precipitated as a red solid. The sodium salt of the product, prepared by neutralizing with sodium carbonate, dyed acetate silk and natural silk a bright red.

It will be understood that the above examples are merely illustrative, and that many variations in the details thereof may be made without departing from the spirit of this invention.

We claim:

1. A dyestuff compound of the general formula

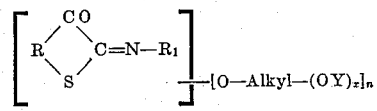

wherein R is an ortho-arylene radical having not more than 10 carbon atoms in its cyclic structure, R₁ is an aryl radical having 6 carbon atoms in its cyclic structure, alkyl stands for a lower alkyl radical, Y stands for the radical of an acid of the group adapted to esterify alcoholic OH groups, while $x$ and $n$ each represent integers not greater than 2.

2. A dyestuff compound of the general formula

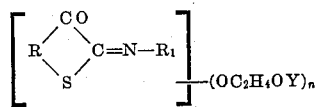

wherein R is an ortho arylene radical having not more than 10 carbon atoms in its cyclic structure, R₁ is an aryl radical having 6 carbon atoms in its cyclic structure, Y is the monobasic radical of a compound selected from the group consisting of polybasic acids and salts thereof, while $n$ designates an integer not greater than 2.

3. A dyestuff compound of the general formula

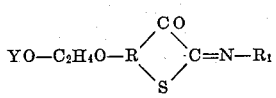

wherein R stands for an ortho-arylene radical having not more than 10 carbon atoms in its cyclic structure, R₁ is an aryl radical having 6 carbon atoms in its cyclic structure, while Y is the monobasic radical of a compound selected from the group consisting of polybasic acids and salts thereof.

4. A dyestuff compound of the general formula

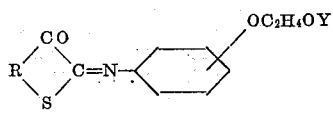

wherein R is an ortho-arylene radical having not more than 10 carbon atoms in its structure, while Y is the monobasic radical of a compound selected from the group consisting of polybasic acids and salts thereof.

5. A dyestuff as in claim 3, wherein Y designates the monobasic radical of an alkali-metal salt of sulfuric acid.

6. A dyestuff as in claim 4, wherein Y designates the monobasic radical of an alkali-metal salt of sulfuric acid.

7. The process of producing a dyestuff compound, which comprises condensing a thioindoxyl compound with a benzenoid compound selected from the group consisting of benzene-nitroso compounds, at least one of said components to be condensed being substituted by a substituent of the form —O—$C_2H_4OH$, and then esterifying the OH group of said substituent by the aid of a polybasic water-soluble acid, employed in quantity not less than 1 mole of the acid per —O—$C_2H_4OH$ group to be esterified.

8. A process as in claim 7, wherein the esterification is effected by the aid of sulfuric acid, and wherein said process includes the further step of neutralizing the residual acidity of the sulfuric acid radical.

JOHN ELTON COLE.
BENJAMIN FRANKLIN SKILES.